May 1, 1928.                                                    1,668,423
C. SCHAEFFER
SUSPENSION DEVICE FOR VEHICLES
Filed April 27, 1927

INVENTOR
CHARLES SCHAEFFER
BY
ATTORNEY

Patented May 1, 1928.

1,668,423

UNITED STATES PATENT OFFICE.

CHARLES SCHAEFFER, OF PARIS, FRANCE, ASSIGNOR TO SOCIETE ANONYME DES ANCIENS ETABLISSEMENTS PANHARD & LEVASSOR, OF PARIS, FRANCE.

SUSPENSION DEVICE FOR VEHICLES.

Application filed April 27, 1927, Serial No. 187,064, and in France May 6, 1926.

The present invention relates to a suspension device for vehicles in which the rear springs are no longer situated adjacent the wheels, but are disposed in the interior of the vehicle frame and are supported at one end by the cross-pieces of the frame and at the other end by the thrust tube of the rear axle.

In this arrangement the springs are concealed in the interior of the vehicle body and will hence offer no resistance to the forward travel, and this is chiefly advantageous for high-speed vehicles with tapered bodies.

Further, the support by which the springs are mounted on the said thrust tube is so disposed that the tube and the support are rotatable on one another; this will much reduce the reaction of the oscillations of the rear wheels about the axis of the vehicle and hence the displacements of the vehicle body will be diminished.

In this manner the rear wheels are made practically independent as to their relation to the vehicle body.

The appended drawing shows by way of example an embodiment of the invention.

Figure 1:
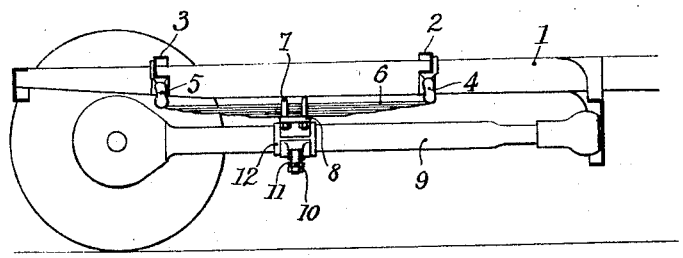
Fig. 1 is a lengthwise section of the vehicle.
Figure 2:
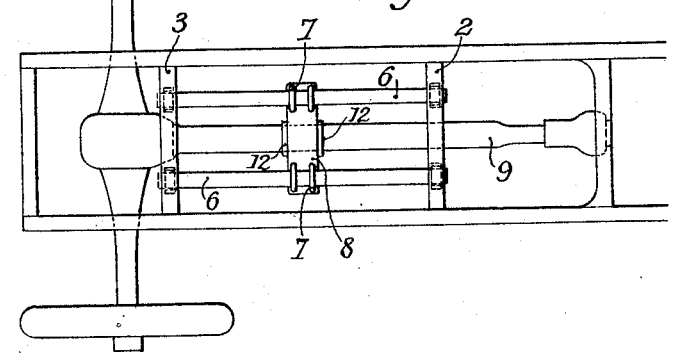
Fig. 2 is a corresponding plan view.
Figure 3:
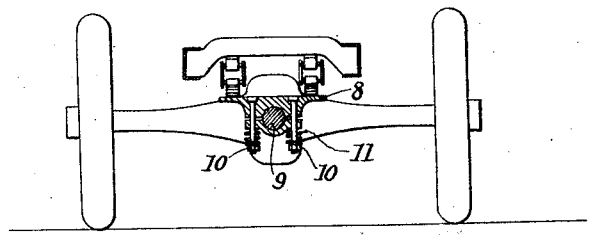

Fig. 3 a rear view.

1 is the vehicle body comprising the cross-pieces 2 and 3 upon which are mounted the shackles 4 and 5 of the springs 6 which are secured by the straps 7 or by like means to the support 8 which is rotatable on the thrust tube 9.

The support 8 comprises a two-part collar which is held by the bolts 10—with the interposition of springs 11—so as to press the said support upon the tube in an elastic manner, whereby the angular oscillations will be damped.

In the present apparatus, the lengthwise motion of the support 8 relatively to the tube 9 is prevented by the thrust rings 12 secured to the said tube.

It is obvious that without departing from the principle of the invention, it is feasible to dispose a single suspension spring in the vertical plane passing through the axis of the said thrust tube. The longitudinal position of the spring or springs may be varied. The springs might be placed in the transverse position or otherwise according to any suitable inclination, provided they may be disposed between the main side bars of the frame.

Having thus described my apparatus, what I claim as new therein, and my own invention, is:—

In a suspension device for motor vehicles provided with a vehicle frame comprising main side beams, springs disposed between the said beams, a thrust tube mounted on the rear axle of the vehicle, and a support in which the said tube is rotatable, said support connecting the said springs with the vehicle frame and also with the said tube.

In testimony whereof I have hereunto affixed my signature.

CHARLES SCHAEFFER.